(12) United States Patent
Alkabie (10) Patent No.: US 6,964,170 B2
(45) Date of Patent: Nov. 15, 2005

(54) NOISE REDUCING COMBUSTOR

(75) Inventor: Hisham Alkabie, Oakville (CA)

(73) Assignee: Pratt & Whitney Canada Corp., Longueuil ( * ) Notice: Subject to any disclaimer, the term of this patent is extended or adjusted under 35 U.S.C. 154(b) by 294 days.

(21) Appl. No.: 10/423,937

(22) Filed: Apr. 28, 2003

(65) Prior Publication Data

US 2004/0211188 A1 Oct. 28, 2004

(51) Int. Cl.$^7$ ............................................... F02C 7/24
(52) U.S. Cl. ........................................ 60/772; 60/725
(58) Field of Search .................... 60/772, 775, 752; 431/114

(56) References Cited

U.S. PATENT DOCUMENTS

| | | |
|---|---|---|
| 2,654,219 A | 10/1953 | Zaba |
| 4,422,300 A | 12/1983 | Dierberger et al. |
| 4,695,247 A | 9/1987 | Enzaki et al. |
| 5,184,455 A | 2/1993 | Ewing et al. |
| 5,216,886 A | 6/1993 | Ewing |
| 5,435,139 A | 7/1995 | Pidcock et al. |
| 5,528,904 A | 6/1996 | Jones et al. |
| 5,598,697 A | 2/1997 | Ambrogi et al. |
| 5,687,572 A | 11/1997 | Schrantz et al. |
| 5,758,504 A | 6/1998 | Abreu et al. |
| 6,282,905 B1 | 9/2001 | Sato et al. |
| 6,330,791 B1 | 12/2001 | Kendall et al. |
| 6,351,947 B1 | 3/2002 | Keller et al. |
| 6,530,221 B1 * | 3/2003 | Sattinger et al. ............... 60/725 |
| 6,640,544 B2 * | 11/2003 | Suenaga et al. ............... 60/725 |
| 6,698,206 B2 * | 3/2004 | Scarinci et al. ............... 60/725 |
| 2001/0004835 A1 | 6/2001 | Alkabie et al. |
| 2004/0060295 A1 * | 4/2004 | Mandai et al. ................. 60/725 |

FOREIGN PATENT DOCUMENTS

| | | |
|---|---|---|
| EP | 0 971 172 | 12/2000 |
| GB | 2 309 296 | 7/1997 |

\* cited by examiner

*Primary Examiner*—Ehud Gartenberg
(74) *Attorney, Agent, or Firm*—Ogilvy Renault (57) ABSTRACT

A gas turbine engine combustor defining a combustion zone therein and being adapted for receiving compressed air from a compressor. The combustor comprises inner and outer walls spaced-apart by a predetermined spacing distance and defines a cavity therebetween. The outer wall has a first area defining at least an impingement aperture therein, the impingement aperture permits fluid flow communication between the compressor and the cavity. The inner wall has a second area corresponding to the first area and defines a plurality of effusion apertures therein, the effusion apertures permitting fluid flow communication between the cavity and the combustion zone, and each of the effusion aperture defines a cross-sectional area smaller than that of the impingement aperture. The effusion apertures are disposed in groups having a predetermined geometric arrangement relative to the impingement aperture and define a ratio of number of effusion apertures to the impingement aperture of between about 2:1 and about 4:1. The combustor thereby provides damping of audible frequencies less that about 1600 Hz passing therethrough.

26 Claims, 6 Drawing Sheets

Fig. 4A

NOISE REDUCING COMBUSTOR

TECHNICAL FIELD

The present invention relates generally to gas turbine engines, and particularly to a gas turbine combustion chamber providing reduced noise levels.

BACKGROUND OF THE INVENTION

Noise produced by gas turbine engines is largely caused by pressure and acoustic vibrations which can occur in and around the combustion chamber under certain conditions. Many advancements have been made to reduce the overall noise levels generated by gas turbine engines. However, few have enabled the reduction of noise generated by the combustion chamber of such a gas turbine engine, such that the far field noise level caused by such powerplants is reduced. Such vibrations can be damped by providing fluid mechanic means which influence the flow of hot combustion gasses sufficiently to completely prevent, or at least significantly suppress, the excitation of acoustic vibrations. Helmholtz resonators have also been employed as damping elements to eliminate undesirable vibrations, which contribute to noise levels.

In U.S. Pat. No. 6,351,947, Keller et al. disclose a combustion chamber for a gas turbine engine that is designed to provide noise absorption over a wide frequency range, particularly between 2 and 6 kHz, while simultaneously providing cooling of the combustion chamber wall. An upstream portion of the combustion chamber wall close to the burner region comprises at least two perforated plates, arranged parallel to one another, and an additional means which acts to absorb noise. The distances between the perforated plates and the geometrical dimensions of the openings therein being selected in such a way that a plurality of mutually connected Helmholtz resonators are formed. In at least one preferred embodiment, at least part of the combustion chamber wall comprises three parallel perforated plates. While the arrangement of Keller et al. permits noise reduction and is less complex than previously known solutions having more complex Helmholtz resonators, it can nevertheless be simplified and optimized such that improved noise reduction is possible, particularly in relatively low frequency ranges.

Published United States patent application No. US 2001/0004835, teaches a gas turbine combustion chamber wall having an outer wall comprising a plurality of impingement holes and an inner wall having a plurality of effusion holes. The impingement holes permit compressed air from around the combustion chamber to pass through to impinge on the inner wall. Air within the cavity between the two walls can then effuse into the combustion chamber. The number of effusion holes is substantially greater than the number of impingement holes, and the effusion holes are preferably arranged in groups of seven disposed in a specific pattern around a larger impingement hole. The particular arrangement of effusion holes and associated impingement holes provides an enhanced cooling effect. This published application does not teach or suggest the use of a similar or modified combustion chamber wall construction to reduce noise levels generated by the combustor. Further, although the use of such a combustion chamber to reduce noise is not explicitly taught, the particular structure, application and relative arrangement of impingement and effusion holes as disclosed in this published application, would limit any potential noise reduction to vibrations in relatively high frequency ranges between about 4500 and 6500 Hertz (Hz).

The use of a gas turbine engine as an Auxiliary Power Units (APU) is well known, particularly to provide compressed air for environmental control systems and power for electrical systems of an aircraft, when it is on the ground. Such APUs are most commonly mounted within the fuselage of the aircraft, often within the tail section in large commercial aeroplanes for examples. Consequently, APUs must adhere to more stringent noise requirements than propulsive gas turbine engines, which are mounted outside the airframe body.

Therefore, there is a need to further reduce noise levels, particularly far field noise levels, produced by all gas turbine engines. This need is particularly relevant for gas turbine engines employed in APU applications. As a result, any further optimization of currently employed combustion chambers to reduce noise levels generated by the combustor, particularly those in the relatively low frequency range which contribute to the far field noise emission, while nevertheless maintaining sufficient combustor wall cooling, would be desirable.

SUMMARY OF THE INVENTION

It is an object of the present invention to provide a gas turbine engine combustor enabling noise reduction.

It is another object of the present invention to provide a combustion chamber double wall arrangement providing low frequency noise reduction.

Therefore, in accordance with the present invention, there is provided a gas turbine engine combustor defining a combustion zone therein and being adapted for receiving compressed air from a compressor, said combustor comprising: inner and outer walls spaced-apart by a predetermined spacing distance and defining a cavity therebetween; said outer wall having a first area defining at least an impingement aperture therein, said impingement aperture permitting fluid flow communication between said compressor and said cavity; said inner wall having a second area corresponding to said first area and defining a plurality of effusion apertures therein, said effusion apertures permitting fluid flow communication between said cavity and said combustion zone, and each said effusion aperture defining a cross-sectional area smaller than that of said impingement aperture; and said effusion apertures being disposed in groups having a predetermined geometric arrangement relative to said impingement aperture and defining a ratio of number of effusion apertures to said impingement aperture of between about 2:1 and about 4:1; whereby said combustor provides damping of audible frequencies less that about 1600 Hz passing therethrough.

There is further provided, in accordance with the present invention, a method of attenuating selected audible frequencies passing through a gas turbine engine combustor having spaced-apart inner and outer walls, the method comprising the steps of: selecting an area in said outer wall and locating at least an impingement aperture therein; and selecting an area in said inner wall corresponding to said area in said outer wall and defining a plurality of effusion apertures in said area of said inner wall, said plurality of effusion apertures being disposed in groups having a predetermined geometric arrangement relative to said impingement aperture and outnumbering said impingement aperture by a ratio of between 2:1 and 4:1; whereby said combustor provides damping of said selected audible frequencies passing therethrough.

BRIEF DESCRIPTION OF THE DRAWINGS

Further features and advantages of the present invention will become apparent from the following detailed description, taken in combination with the appended drawings, in which:

FIG. 4b is a schematic isometric view of the combustion chamber double-wall of FIG. 3, having the arrangement of holes according to FIG. 4a.

DETAILED DESCRIPTION OF THE PREFERRED EMBODIMENT

Figure 1:
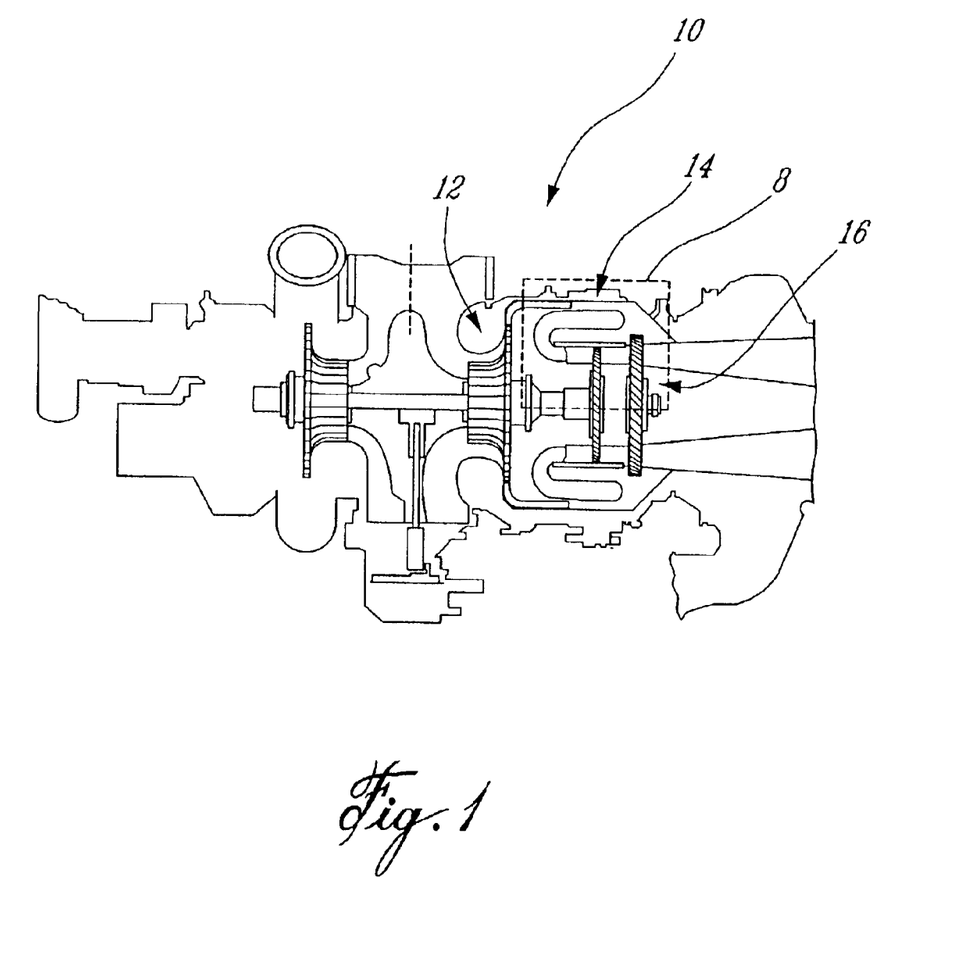
FIG. 1 is a schematic cross-sectional view of a gas turbine engine having a combustion chamber according to the present invention.

Referring to FIG. 1, a gas turbine engine 10 generally comprises a compressor region 12, a turbine region 16, and a combustor region 14 having a noise reducing combustion chamber 30 according to the present invention. The noise reducing combustion chamber 30 is preferably adapted for use in a gas turbine engine 10 employed as an Auxiliary Power Unit (APU) in a aircraft. However, the present noise reducing combustion chamber 30 can be used in any gas turbine engine.

Figure 2:
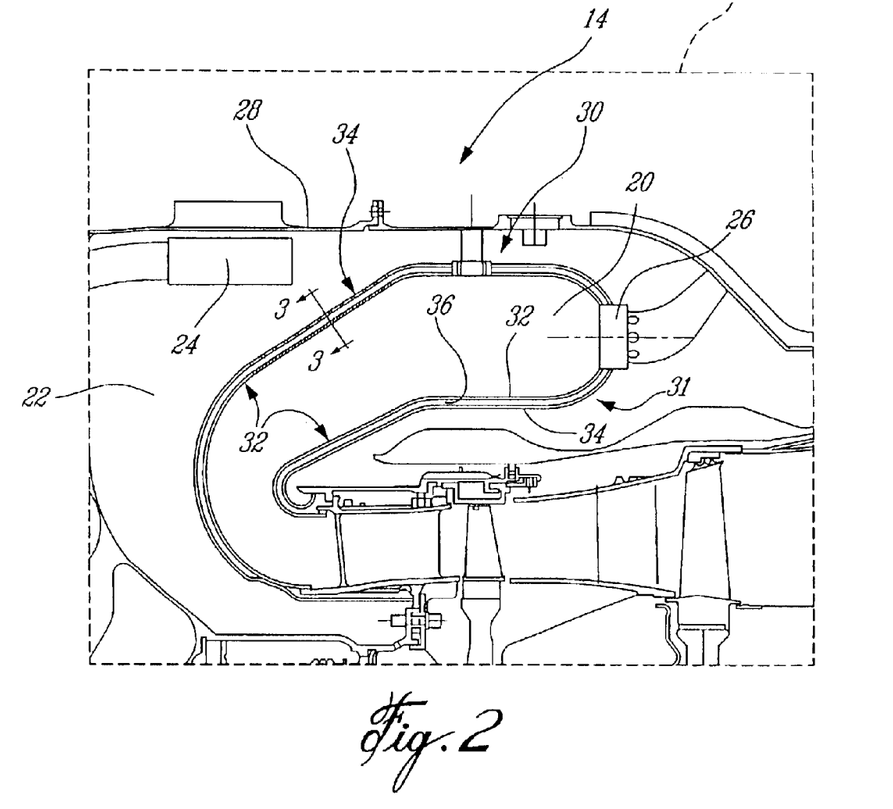
FIG. 2 is a cross-sectional view of the combustion chamber according to the present invention, taken from detail 8 of FIG. 1.

FIG. 2, taken from detail 8 of FIG. 1, depicts the combustor region 14 in greater detail. Generally, the combustor region 14 comprises an annularly shaped, noise reducing combustion chamber 30 which defines a combustion zone 20 therein. The combustion chamber 30 is disposed within a larger annular chamber 22 which receives compressed air from a compressor discharge 24. The inner combustion zone 20 and the outer annular chamber 22 are in fluid flow communication, via apertures in the combustion chamber 30 as will be described in more detail below. A plurality of fuel nozzles 26 project through the combustion chamber 30 into the combustion zone 20, and provide sprayed fuel into the combustion zone 20 such that the fuel can mix with the compressed air within the combustion zone 20 and can be ignited to initiate continuous combustion within the combustion chamber 30.

Figure 3:
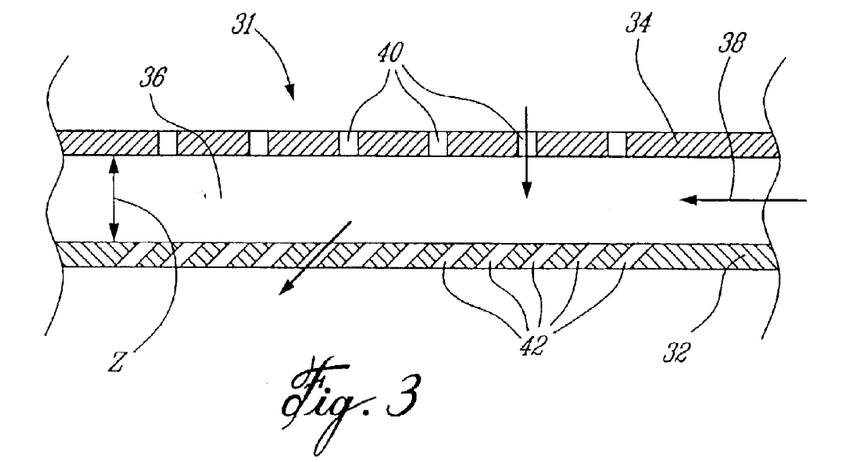
FIG. 3 is a schematic sectional view of the combustion chamber double-wall, taken along line 3—3 of FIG. 2.

The combustion chamber 30 comprises a combustor double-wall 31, having an inner effusion wall 32 and an outer impingement wall 34. The inner effusion wall 32 and the outer impingement wall 34 are spaced apart, to create a cavity 36 therebetween. As best seen in FIG. 3, a plurality of impingement apertures 40 are defined through the outer impingement wall 34, and a plurality of smaller, effusion apertures 42 are defined through the inner effusion wall 32. Apertures in a double-wall combustor are well known in the art for providing cooling of the outer surfaces of the combustion chamber. Although the impingement apertures 40 and the effusion apertures 42 will be described throughout with respect to arrangements according to the present invention for provided improved noise reduction, it is to be understood that these apertures nevertheless provide such known combustion chamber wall cooling properties in addition to reducing combustor noise levels as will be further discussed below.

Preferably, the number of effusion apertures 42 is greater than the number of impingement apertures 40, and the effusion apertures 42 in the inner effusion wall 32 are offset from the impingement apertures 40 in the outer impingement wall 34, such that air flow passing through the impingement apertures 40 can not pass through the effusion apertures 42 without first having been re-circulated within the cavity 36. As seen in FIG. 3, the effusion apertures 42 are preferably provided in the inner effusion wall 32 at an angle, such that they are inclined to permit fluid flowing through the cavity 36 in a stream-wise direction 39 to easily effuse into the combustion zone 20 defined within the combustor double-wall 31 of the combustion chamber 30. However, the effusion apertures 42 can also extend perpendicularly through the inner effusion wall 32. The impingement apertures 40 are preferably perpendicularly provided through the outer impingement wall 34. The outer impingement wall 34 and the inner effusion wall 32 are depicted in FIG. 3 as being generally parallel to each other, however they can also be arranged such that they are not parallel, without affecting the noise reducing capabilities of the double-walled combustion chamber 30.

The impingement apertures 40 and the effusion apertures 42 are provided in particular, predetermined arrangements relative to each other, as will be described below with reference to FIGS. 4a–6. These particular arrangements are such that the impingement apertures 40 and the effusion apertures 42 together act like a plurality of resonators to help absorb the fluid pressure fluctuations which are often attributed to non-uniform heat release at the flame front within the combustion zone 20. Preferably, the impingement apertures 40 and the effusion apertures 42 are arranged such that the highest possible pressure differential is provided across the combustor double-wall 31 of the combustion chamber 30, with the largest pressure drop being across the jet orifices of the impingement apertures 40. Preferably, the ratio of the pressure drop across the outer impingement wall 34 to that across the inner effusion wall 32 is at least 1.5 to 1. The perpendicular distance Z, defining the spacing distance between the inner effusion wall 32 and the outer impingement wall 34, can be selected depending on the particular engine application and the preferred engine design conditions and inlet parameters, however, it is preferably selected in relation to the size of the effusion apertures 42 and the spacing of the effusion apertures 42 in the stream-wise direction 38, as will be described in further detail below.

The present combustion chamber 30 aims to provide attenuation of broad band low frequencies generated in the combustion region 14, which are caused by the engine compressor and delivered to the outer chamber 22 via the compressor discharge 24 and/or generated by the combustion process itself within the combustion zone 20. The attenuation of frequencies less than about 1600 Hertz (Hz) significantly reduces the far field noise emission levels produced by the combustion chamber of a gas turbine engine. The combustion process itself, where chemical reactions take place and energy is released from the combustion of fuel mixed with compressed air, is likely a major contributor to far field noise originating from the engine core. The compressed air delivery to the combustor region 14 likely further contributes to this far field noise. It is believed that substantially low frequencies, which may range between 0 and approximately 1600 Hz, contribute significantly to far field noise caused by the engine. The combustion chamber 30 according to the present invention particularly attenuates such low frequency vibrations, thereby enabling reduced combustion noise levels which contribute to the overall far field noise generated by the engine.

Further, it is believed that low frequency vibrations produced by the combustion process from within the combustion chamber 30 can couple together with low frequency vibrations in the combustion region 14 produced by the compressor, thereby amplifying vibrations in this low frequency range, causing an increased core engine noise contribution to the overall engine far field noise levels. The particular predetermined arrangements of impingement apertures 40 and effusion apertures 42 of the present invention permit the decoupling of the frequency ranges imposed by the compressor on the combustor. This is relatively simply achieved by the particular number, size, and relative arrangement of impingement apertures 40 and effusion apertures 42, which act to impose a time delay on the coupled low frequency vibrations, thereby decoupling the low frequency acoustic vibration fluctuations generated by the compressor region 12 and noise generated by the combustion process in the combustor region 14. Particularly, the decoupling effect is imposed on the desired frequency range due to the time delay that is forced between entry to the impingement apertures 40 and effusion apertures 42. This decoupling time delay is a function of the geometrical arrangement of both sets of apertures, the gap distance Z between the inner effusion wall 32 and the outer impingement wall 34, and the pressure differential across the two walls. Low frequency noise generated by the combustion process is also dissipated through the effusion apertures 42 of the inner effusion wall 32 and into the cavity 36 of the combustor double-wall 31 of the combustion chamber 30. The air jets from the impingement apertures 40 which impinge on the inner effusion wall 32 experience static and dynamic pressure redistributions. Such dynamic pressure redistributions create small recirculation zones which act as energy trappers for the impinging air, and help to reduce the noise levels imposed on the combustion chamber 30.

Preferably, the ratio of the number of effusion apertures 42 to the number of impingement apertures 40 is between 2:1 and 4:1. Even more preferably, the ratio of the number of effusion apertures 42 to the number of impingement apertures 40 is 3:1.

Figure 4A:
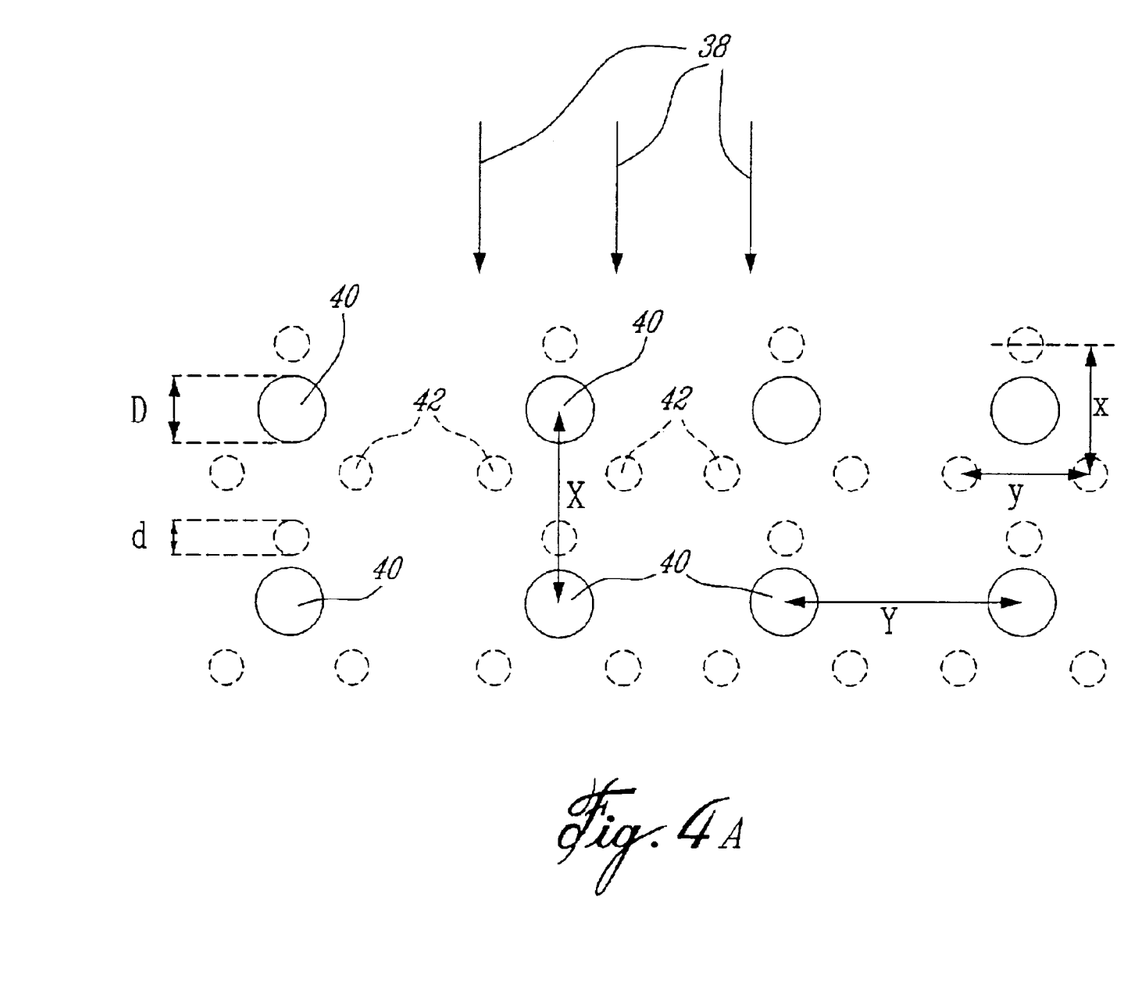
FIG. 4a is a schematic top elevation view of an arrangement of holes in the combustion chamber double-wall according to a first embodiment of the present invention.
Figure 4B:
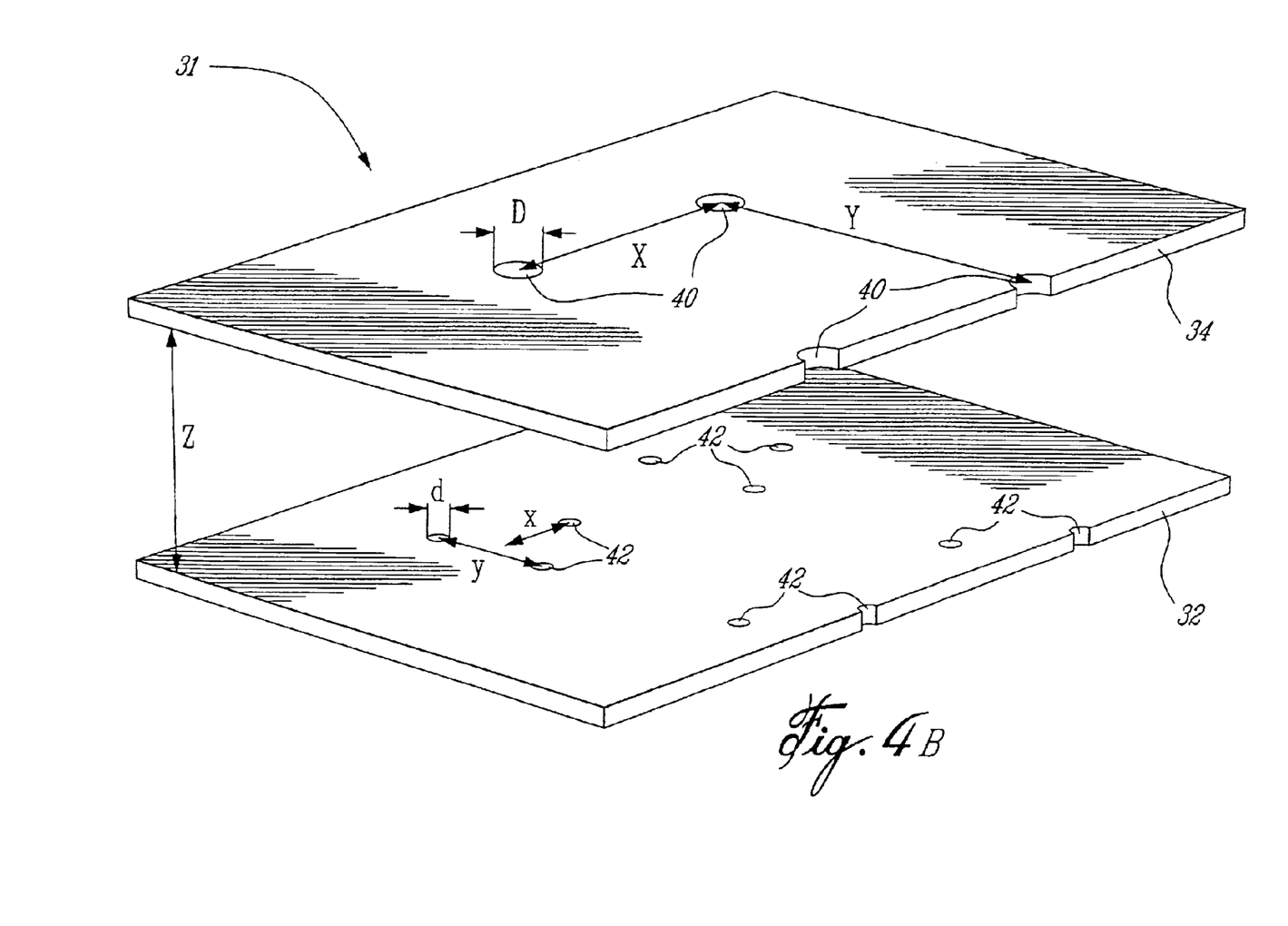

Referring to FIGS. 4a and 4b, a first embodiment of the relative arrangement of impingement apertures 40 and effusion apertures 42 is clearly seen. Particularly, a group of 3 effusion apertures 42 is disposed relative to each impingement aperture 40. The effusion apertures 42 in each group are preferably equally spaced from one another, being arranged at vertices of an equilateral triangle defined by the effusion apertures 42. The impingement aperture 40 is preferably disposed with each such triangular group of effusion apertures 42, being positioned closest to the effusion aperture 42 that is located most upstream relative to the direction of flow 38 through the cavity 36 of the combustor double-wall 31. The effusion apertures 42 of each group are spaced apart in a stream-wise direction, substantially parallel to the direction of flow 38, by a distance x, and in the span-wise direction, substantially perpendicular to the direction of flow 38, by a distance y. The impingement apertures 40 are spaced apart in the stream-wise direction by a distance X, and in the span-wise direction by a distance Y. The impingement apertures 40 and the effusion apertures 42 described and depicted herein are preferably circular holes. As such, the impingement apertures 40 are shown having a diameter D, and the effusion apertures having a diameter d. The size of the impingement and effusion apertures 40 and 42, and therefore the particular values of the their diameters, preferably depend on the particular engine design conditions and the application of the engine. However, the diameters of the impingement and effusion apertures 40 and 42 are preferably related to the spacing of the apertures and the gap spacing Z between the inner effusion wall 32 and the outer impingement wall 34. Preferably, the ratio of the gap spacing Z between the two walls of the combustor double-wall 31, best seen in FIG. 4b, to the diameter d of the effusion apertures 42, is equal to the ratio of the stream-wise distance x between the effusion apertures 42 to the diameter d of the effusion apertures 42. Namely, that $Z/d=x/d$. This can also be equal to the ratio of the span-wise spacing distance y of the effusion apertures 42 to their diameters d, such that $Z/d=x/d=y/d$. However, for certain applications and particular engine running conditions, the ratio of the gap spacing Z to the diameter D of the impingement apertures 40 can also be selected such that it is equal to the stream-wise spacing distance X of the impingement apertures 40 to their diameters D, and equal to the span-wise spacing distance Y of the impingement apertures 40 to their diameter D. Namely, that $Z/D=X/D=Y/D$.

FIG. 4a shows rows of substantially evenly spaced groups of effusion apertures 42. Preferably, the density of effusion apertures 42 in the inner effusion wall 32 is between 45–65 apertures per square inch (approximately between 7 and 10 apertures per square centimeter) of wall surface area. The exact density can be selected within this range for best results by one skilled in the art, depending on the performance of the fuel nozzles and the particular fuel/air mixing uniformity of the combustion chamber 30. The necessary density of impingement apertures 40 is selected accordingly, the density of the effusion apertures 42 being the delimiting factor. The density of effusion apertures 42 per unit surface area of the inner effusion wall 32 can also vary along the entire length or width of the combustion chamber 30. Such a non-uniform density of effusion apertures 42 relative to impingement apertures 40 can be selected depending on the particular shape of the combustion chamber 30 and the particular engine application and operating conditions, in order to best provide noise reduction in the low frequency range defined above.

Figure 5:
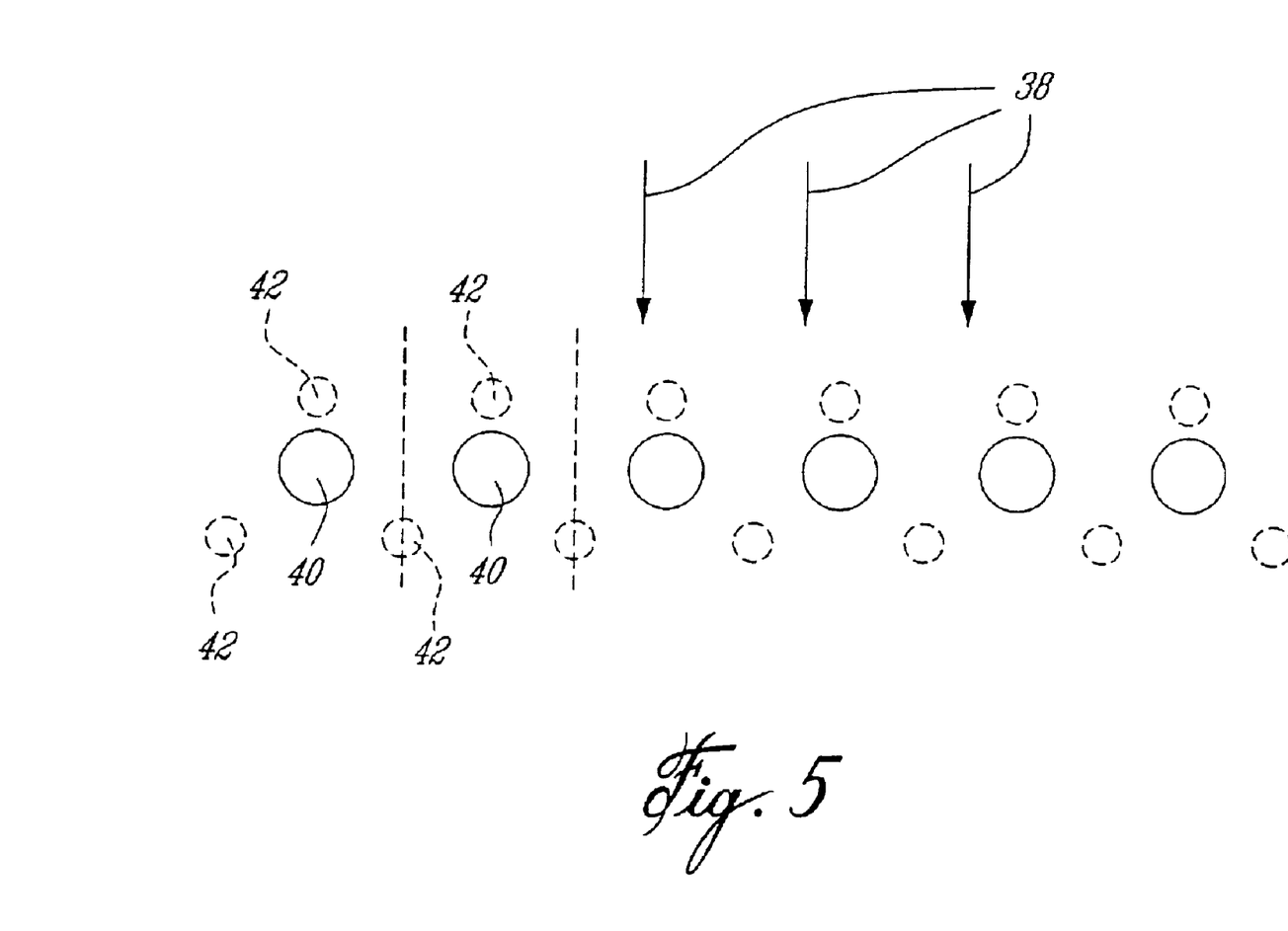
FIG. 5 is a schematic top elevation view of an alternate arrangement of holes in the combustion chamber double-wall according to a second embodiment of the present invention.

Referring now to the alternate arrangement of impingement apertures 40 and effusion apertures 42 in the second embodiment FIG. 5, in which the ratio of the number of effusion apertures 42 to the number of impingement apertures 40 is 2:1. Particularly, a group of 3 effusion apertures 42 is disposed relative to each impingement aperture 40, but each group of effusion apertures 42 shares two effusion apertures 42 with opposed adjacent groups. Therefore, each impingement aperture 40 is disposed downstream, relative to a direction of fluid flow 38 in the cavity 36, of an effusion aperture 42, and two effusion apertures 42, each shared with an adjacent group on either side of the impingement aperture 40, are disposed downstream again therefrom. As such, for each impingement aperture 40 in this embodiment there is one whole and two "half", or shared, effusion apertures 42, and thereby a ratio of the number of effusion apertures 42 to the number of impingement apertures 40 of 2:1.

Figure 6:
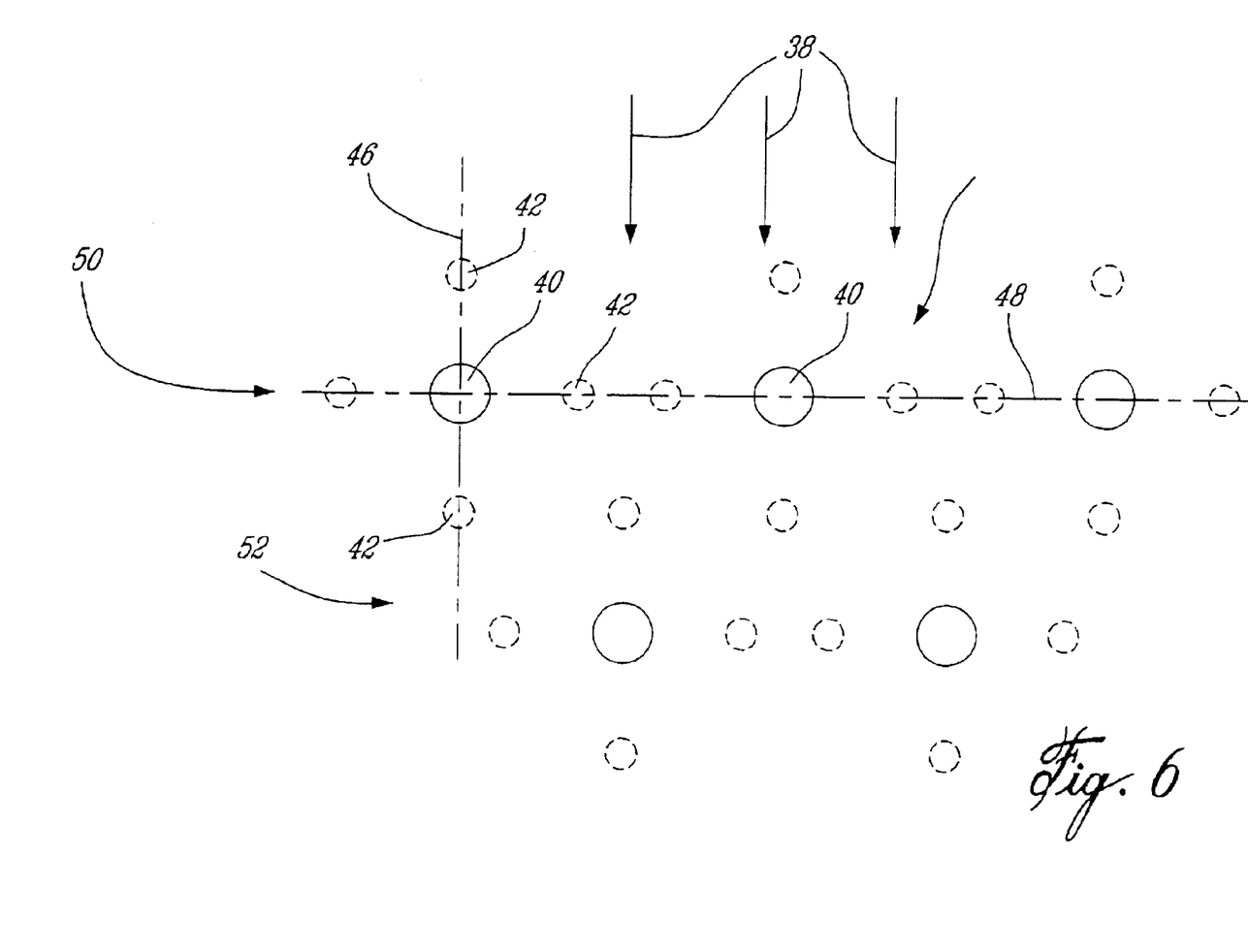
FIG. 6 is a schematic top elevation view of an alternate arrangement of holes in the combustion chamber double-wall according to a third embodiment of the present invention.

Referring to the alternate arrangement of impingement apertures 40 and effusion apertures 42 in the third embodiment FIG. 6, in which the ratio of the number of effusion apertures 42 to the number of impingement apertures 40 is 4:1. In this embodiment, each impingement aperture 10 is positioned substantially at a center of a group of four effusion apertures 42, disposed at vertices of a square oriented such that the centers of two effusion apertures 42 are coincident with a stream-wise axis 46 passing through the center of the impingement aperture 40, and two effusion apertures 42 are coincident with a span-wise axis 48 passing through the center of the impingement aperture 40. The span-wise and stream-wise directions are relative to a direction of fluid flow 38 through the cavity 36 between the inner effusion wall 32 and the outer impingement wall 34 of the combustor double-wall 31. Such groups of four effusion apertures 42 are repeated an equal span-wise distance from one another along a first row 50, with one impingement aperture disposed relative to each group as described. In a second downstream row 52, the groups of effusion apertures 42 and impingement aperture 40 are span-wise offset relative to the first row 50 by an amount approximately half the span-wise spacing distance between the adjacent groups of effusion apertures 42 in the first row 50. All subsequent rows are similarly alternately staggered such that the groups of four effusion apertures 42 around each impingement aperture 40 are offset from those in immediately adjacent upstream and downstream rows.

The particular arrangement of effusion apertures 42 to impingement apertures 40 described above can be selected by one skilled in the art to best suit the desired engine application and operating conditions. However, the main object achieved with all of the aperture arrangements of the present invention, is that sound energy is dissipated by the attenuation of selected frequencies as the vibrations pass through the outer impingement wall 34 and the inner effusion wall 32 if the noise source is outside the combustion chamber 30, and vice versa if the noise source emanates from within the combustion chamber 30. Particularly, the number and arrangement of the impingement apertures 40 and effusion apertures 42 determines the frequency range and attenuation achieved therewithin by the combustor double-wall 31. The relationship between the number of apertures in each wall, their size, and their relative spacing can preferably be related using a geometrically derived parameter, the Transparency Index (TI). Particularly, the TI equals the aperture density multiplied by the square of the aperture diameter, divided by the thickness of the wall and the square of the shortest distance between apertures. Namely, this relationship is $TI=nd^2/ta^2$, where: n is the number of apertures per square inch; d is the aperture diameter in inches; t is the wall thickness in inches; and a is the shortest distance between apertures in inches. From this, the total impingement/effusion noise absorption can be derived. Particularly, the total noise absorption is equal to the product of the surface area (SA) of the impingement wall and an impingement absorption coefficient ($\alpha_{impingement}$) added to the product of the surface area (SA) of the effusion wall and the effusion absorption coefficient ($\alpha_{effusion}$). Namely, the Total Noise Absorption=$(\alpha SA)_{impingement}$+$(\alpha SA)_{effusion}$, where the absorption coefficients are functions of the TI defined above.

While the Inter-relationship between the number of apertures in each wall, their size, and their relative spacing is outlined above, the numerical values of these parameters in the preferred embodiments of the invention are as follows: d is preferably between about 0.5 mm and about 1 mm (approximately between 0.0197 and 0.0394 inches); D is preferably between about 1.5 and about 3.5 mm (approximately between 0.0591 and 0.1378 inches); Z is preferably between about 3 mm and about 6 mm (approximately between 0.1181 and 0.2362 inches); x and y are preferably between about 1.5 and about 3 times d; X and Y are preferably between about 1.5 and about 3 times D; and wall thickness t is preferably between about 1 mm and about 3 mm (approximately between 0.0394 and 0.1181 inches).

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

What is claimed is:

1. A gas turbine engine combustor defining a combustion zone therein and being adapted for receiving compressed air from a compressor, said combustor comprising:

inner and outer walls spaced-apart by a predetermined spacing distance and defining a cavity therebetween;

said outer wall having a first area defining at least an impingement aperture therein, said impingement aperture permitting fluid flow communication between said compressor and said cavity;

said inner wall having a second area corresponding to said first area and defining a plurality of effusion apertures therein, said effusion apertures permitting fluid flow communication between said cavity and said combustion zone, and each said effusion aperture defining a cross-sectional area smaller than that of said impingement aperture; and said effusion apertures being disposed in groups having a predetermined geometric arrangement relative to said impingement aperture and defining a ratio of number of effusion apertures to said impingement aperture of between about 2:1 and about 4:1;

whereby said combustor provides damping of audible frequencies less that about 1600 Hz passing therethrough.

2. The combustor as defined in claim 1, wherein said first area defines a plurality of impingement apertures therein, and each of said groups of effusion apertures are disposed relative to each of said impingement apertures.

3. The combustor as defined in claim 2, wherein said ratio is about 3:1.

4. The combustor as defined in claim 3, wherein said groups of effusion apertures define a triangular-shaped arrangement with said effusion apertures being disposed at vertices thereof.

5. The combustor as defined in claim 4, wherein said triangular-shaped arrangement defines a substantially equilateral triangle.

6. The combustor as defined in claim 4, wherein each of said impingement apertures is disposed within boundaries defined by one of said triangular-shaped arrangements.

7. The combustor as defined in claim 4, wherein a first one of said effusion apertures is upstream relative to the two other effusion apertures of in each of said triangular-shaped arrangements, and each of said impingement apertures is disposed downstream of said first effusion aperture.

8. The combustor as defined in claim 1, wherein said effusion apertures are defined in said second area of said inner wall in a density of between about 45 and about 65 apertures per square inch.

9. The combustor as defined in claim 8, wherein said density of effusion apertures varies throughout said inner wall.

10. The combustion chamber as defined in claim 9, wherein said first area defines a plurality of impingement apertures therein, and a ratio of said density of effusion apertures to a density of said impingement apertures varies throughout said combustor.

11. The combustor as defined in claim 1, wherein said effusion apertures in said inner wall define central axes extending therethrough, said central axes being inclined relative to an axis normal to said inner wall.

12. The combustion chamber as defined in claim 11, wherein said central axes are inclined downstream relative to a direction of fluid flow in said cavity.

13. The combustor as defined in claim 1, wherein said groups of effusion apertures comprise four effusion apertures disposed at vertices of a square having said impingement aperture at a center thereof.

14. The combustor as defined in claim 13, wherein a first two of said four effusion apertures are coincident with a stream-wise axis passing through a center of said impingement aperture, and the other two of said four effusion apertures are coincident with a span-wise axis passing through said center of said impingement aperture.

15. The combustor as defined in claim 14, wherein said first area defines a plurality of impingement apertures, each of said groups of four effusion apertures being disposed about each of said impingement apertures.

16. The combustor as defined in claim 15, wherein said groups of effusion apertures are span-wise equally spaced from one another, and define a first row of said groups in said inner wall.

17. The combustor as defined in claim 16, wherein at least a second row of said groups identical to said first row are disposed in said inner wall downstream from said first row, said second row having said groups span-wise offset from said groups in said first row.

18. The combustor as defined in claim 1, wherein said first area defines a plurality of impingement aperture therein and said impingement apertures and said effusion apertures are circular holes, said impingement apertures each having a first diameter and each of said effusion apertures having a second diameter smaller than said first diameter.

19. The combustor as defined in claim 18, wherein a ratio of said predetermined spacing distance to said second diameter is substantially equal to a ratio of a stream-wise distance between said effusion apertures within each of said groups to said second diameter.

20. The combustor as defined in claim 19, wherein a span-wise distance between said effusion apertures within each of said groups of effusion apertures is substantially equal to said stream-wise distance between said effusion apertures within each of said groups.

21. The combustor as defined in claim 18, wherein a ratio of said predetermined spacing distance to said first diameter is substantially equal to a ratio of a stream-wise distance between said impingement apertures to said first diameter.

22. The combustion chamber as defined in claim 21, wherein a span-wise distance between said impingement apertures is equal to said stream-wise distance between said impingement apertures.

23. A method of attenuating selected audible frequencies passing through a gas turbine engine combustor having spaced-apart inner and outer walls, the method comprising the steps of:

selecting an area in said outer wall and locating at least an impingement aperture therein; and selecting an area in said inner wall corresponding to said area in said outer wall and defining a plurality of effusion apertures in said area of said inner wall, said plurality of effusion apertures being disposed in groups having a predetermined geometric arrangement relative to said impingement aperture and outnumbering said impingement aperture by a ratio of between 2:1 and 4:1;

whereby said combustor provides damping of said selected audible frequencies passing therethrough.

24. The method as defined in claim 23, further comprising selecting said predetermined geometric arrangement and said ratio of said effusion apertures to said impingement aperture to provide damping of audible frequencies less than about 1600 Hz.

25. The method as defined in claim 24, further comprising providing a plurality of impingement apertures in said outer wall, said groups of effusion apertures being disposed about each of said plurality of impingement apertures.

26. The method as defined in claim 25, further comprising selecting said predetermined geometric arrangement from an arrangement having one of a triangular-shaped and a square-shaped perimeter, said effusion apertures being disposed at vertices thereof.

* * * * *